US007791613B2

(12) United States Patent
Kulkarni

(10) Patent No.: US 7,791,613 B2
(45) **Date of Patent: *Sep. 7, 2010**

(54) GRAPHICS MEMORY SWITCH

(75) Inventor: Sunil A. Kulkarni, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 12/116,124

(22) Filed: May 6, 2008

(65) Prior Publication Data

US 2008/0204467 A1 Aug. 28, 2008

Related U.S. Application Data

(63) Continuation of application No. 10/746,422, filed on Dec. 24, 2003, now Pat. No. 7,411,591.

(51) Int. Cl.
*G06F 12/10* (2006.01)
*G06F 3/00* (2006.01)
*G06T 1/60* (2006.01)

(52) U.S. Cl. ............................ 345/568; 345/530; 710/4

(58) Field of Classification Search ................. 345/530, 345/564, 566, 568; 710/1, 3, 4, 8
See application file for complete search history.

(56) References Cited

U.S. PATENT DOCUMENTS

| | | | |
|---|---|---|---|
| 5,905,509 | A | 5/1999 | Jones et al. |
| 5,999,743 | A | 12/1999 | Horan et al. |
| 6,192,455 | B1 | 2/2001 | Bogen et al. |
| 6,192,457 | B1 | 2/2001 | Porterfield |
| 6,457,068 | B1 | 9/2002 | Nayyar et al. |
| 6,525,739 | B1 | 2/2003 | Gurumoorthy et al. |
| 6,618,770 | B2 | 9/2003 | Nayyar et al. |
| 6,633,296 | B1 | 10/2003 | Laksono et al. |
| 6,741,258 | B1 | 5/2004 | Peck et al. |
| 6,760,793 | B2 | 7/2004 | Kelley et al. |
| 6,832,269 | B2 | 12/2004 | Huang et al. |
| 7,047,320 | B2 | 5/2006 | Arimilli et al. |

(Continued)

FOREIGN PATENT DOCUMENTS

| | | |
|---|---|---|
| EP | 0908826 A | 4/1999 |
| JP | 2291035 | 11/1990 |
| JP | 2003323338 | 11/2003 |

OTHER PUBLICATIONS

Stokes, Jon. "PCI Express: An Overview". Jul. 7, 2004. http://arstechnica.com/articles/paedia/hardware/pcie.ars/1.

(Continued)

*Primary Examiner*—Joni Hsu
(74) *Attorney, Agent, or Firm*—Blakely, Sokoloff, Taylor & Zafman LLP

(57) ABSTRACT

A graphics device delivers a graphics address to a graphics memory switch that includes a graphics random access memory translator and a graphics memory page table. The graphics memory address is delivered to the graphics memory switch via a point-to-point, packet based interconnect. The graphics memory switch generates a physical system memory address and delivers the physical address to a root complex. The physical system memory address is delivered to the root complex via a point-to-point, packet based interconnect.

20 Claims, 7 Drawing Sheets

U.S. PATENT DOCUMENTS

| | | | |
|---|---|---|---|
| 7,111,095 | B2 | 9/2006 | Watkins et al. |
| 2002/0118204 | A1 | 8/2002 | Aleksic et al. |
| 2003/0126274 | A1 | 7/2003 | Harriman et al. |
| 2003/0126281 | A1 | 7/2003 | Harriman |
| 2003/0221041 | A1 | 11/2003 | Watkins |
| 2003/0221042 | A1 | 11/2003 | Watkins |
| 2004/0139246 | A1 | 7/2004 | Arimilli et al. |
| 2004/0148360 | A1 | 7/2004 | Mehra et al. |

OTHER PUBLICATIONS

"Reverse Bridge Provides Upgrade Route to PCI Express—Interface ICs"; http://www.cieonline.co.uk/cie2/articlen.asp?=pid=329&id=3239.

International Search Report, PCT International Application No. PCT/US2004/043650 (Graphics Memory Switch), Jun. 24, 2006.

GRAPHICS MEMORY SWITCH

CROSS-REFERENCE TO RELATED APPLICATIONS

This is a continuation U.S. patent application Ser. No. 10/746,422, filed Dec. 24, 2003, issued as U.S. Pat. No. 7,411,591 on Aug. 12, 2008 whose entire contents are hereby incorporated by reference.

BACKGROUND OF THE INVENTION

The present invention pertains to the field of semiconductor devices. More particularly, this invention pertains to the field of using a graphics memory switch to provide a graphics device access to system memory.

SUMMARY OF THE INVENTION

The rapid and efficient transfer of information between a graphics device and system memory has been and will continue to be one of the most challenging tasks faced by computer system component designers. Through the years, different interface protocols have been used to accomplish these transfers. Several years ago, the Peripheral Component Interconnect (PCI) bus was a commonly used implementation to couple graphics devices to memory controllers. As graphics memory bandwidth requirements increased, the Accelerated Graphics Port (AGP) specification was created and adopted by a large segment of the computer industry.

One of the main advantages of the AGP implementations is the ability of the graphics device to view a large, contiguous graphics memory space where multi-megabyte textures, bitmaps, and graphics commands are stored. A graphics address remapping table is used to generate addresses to system memory from graphics memory addresses. There is no actual memory behind the graphics memory space, but the graphics address remapping table and associated translation circuitry provides access to actual system memory pages that may be scattered throughout the system memory.

Graphics memory bandwidth requirements continue to increase, and faster interconnect technologies are being developed to keep ahead of the growing requirements. One such interconnect technology is based on the PCI Express specification (PCI Express Base Specification, revision 1.0a). It would be desirable to provide a large, contiguous, graphics memory space for use with these emerging interconnect technologies.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, a graphics device delivers a virtual graphics address to a graphics memory switch that includes a graphics random access memory translator and a graphics memory page table. The virtual graphics memory address is delivered to the graphics memory switch via a point-to-point, packet based interconnect. The graphics memory switch generates a physical system memory address and delivers the physical address to a root complex. The physical system memory address is delivered to the root complex via a point-to-point, packet based interconnect.

For the embodiments described herein, virtual graphics addresses are defined as graphics addresses that are physical, but where no real physical memory exists at these addresses. In other words, converting virtual graphics addresses to physical memory addresses involves only a graphics memory switch and a graphics memory page table, and no system page tables are required. Another way to look at the conversion of virtual graphics addresses to physical system memory addresses is to see the conversion as including converting physical graphics addresses (contiguous, non-existent) to physical system memory addresses (non-contiguous, existent).

Figure 1:
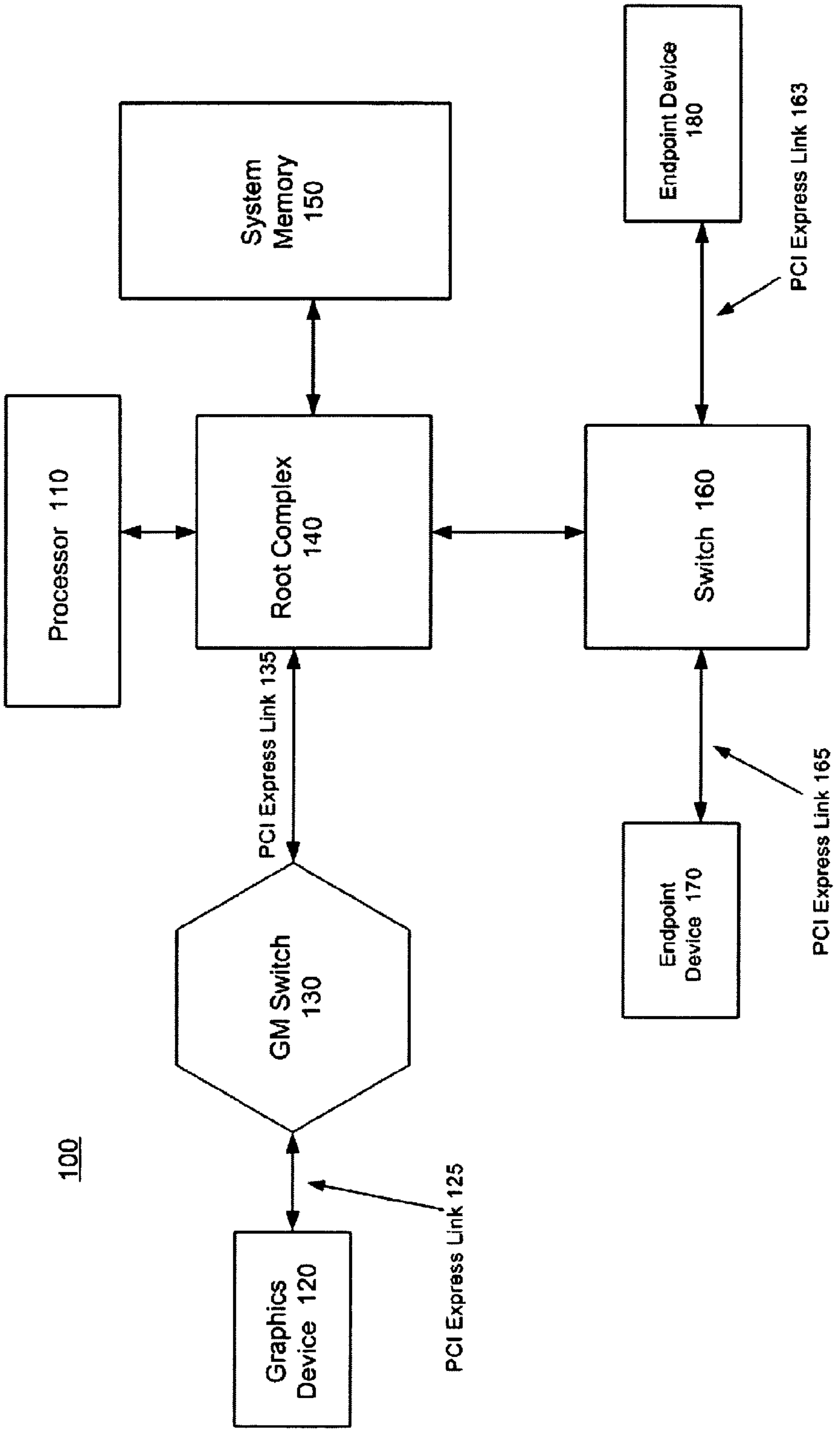
FIG. 1 is a block diagram of one embodiment of a computer system including a graphics memory switch.

FIG. 1 is a block diagram of one embodiment of a computer system 100 including a graphics memory switch 130. The system 100 includes a processor 110 coupled to a root complex 140. The root complex 140 includes a memory controller (not shown) to provide communication with a system memory 150. The root complex 140 is further coupled to a switch 160. The switch 160 is coupled to an endpoint device 170 via an interconnect 165. The switch 160 is also coupled to an endpoint device 180 via an interconnect 163. The endpoint devices 170 and 180 may be any of a wide variety of computer system components, including hard disk drives, optical storage devices, communications devices, etc.

For this example embodiment, the links 163 and 165 adhere to the PCI Express specification. The root complex 140 and the switch 160 also comply with the PCI Express specification.

The system 100 further includes a graphics device 120 that is coupled to a graphics memory (GM) switch 130 via a point-to-point, packet based interconnect, which for this example embodiment is a PCI Express interconnect 125. The GM switch 130 is further coupled to the root complex 140 via another point-to-point interconnect, which for this example embodiment is a PCI Express Link 135.

The graphics device 120 may be a component soldered to a motherboard, or may be located on a graphics card, or may be integrated into a larger component.

Although the system 100 is shown with the graphics device 120, the GM switch 130, and the root complex 140 as separate devices, other embodiments are possible where the GM switch 130 is integrated into one device along with the root complex 140. Yet other embodiments are possible where the graphics device 120, the GM switch 130, and the root complex 140 are integrated into a single device.

For the system 100, a contiguous memory called graphics random access memory (GRAM) is allocated in system address space. However, there is no real memory behind the GRAM. The GRAM is seen by the graphics device 120 as a large, contiguous memory space. An operating system will allocate the GRAM as pages scattered all over the system memory 150, wherever it can find space.

Figure 2:
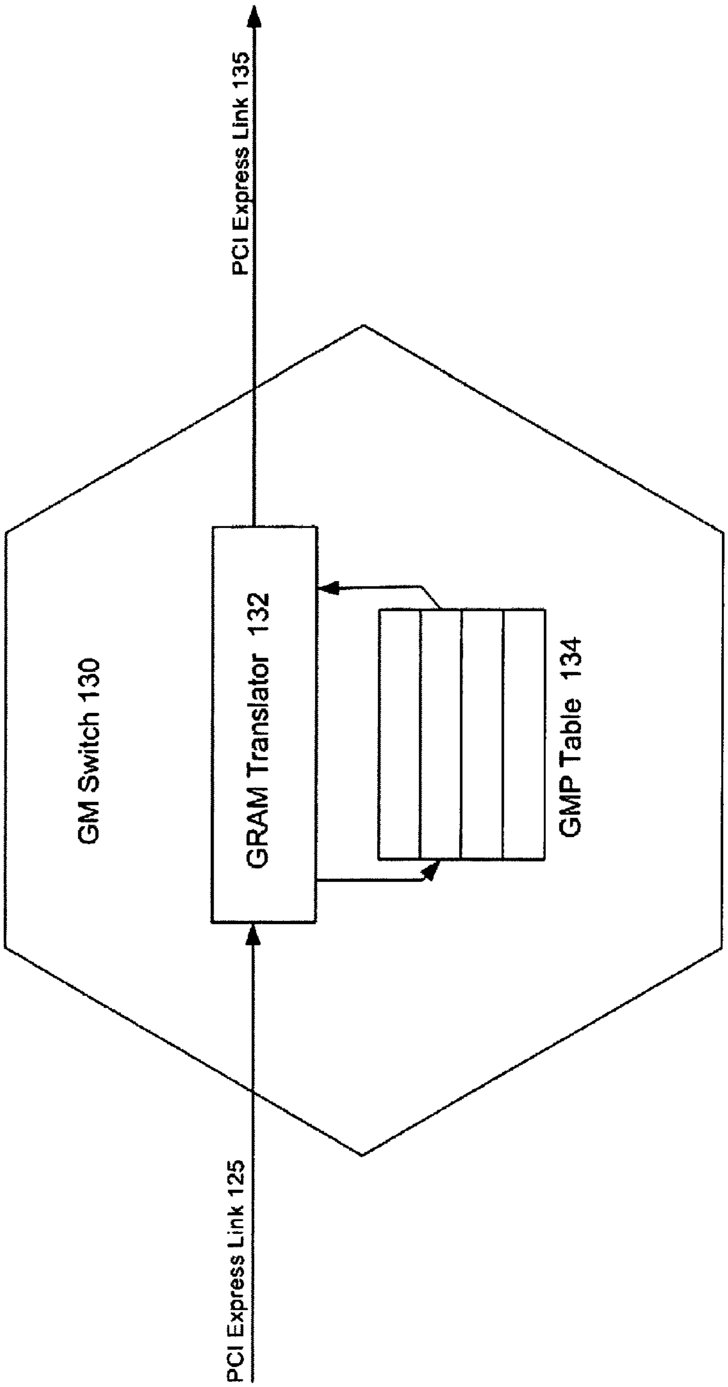
FIG. 2 is a block diagram of a graphics memory switch including a graphics random access memory translator and a graphics memory page table.

FIG. 2 is a block diagram of the GM switch 130. The GM switch includes a GRAM translator 132 and a graphics memory page (GMP) table 134. The GMP Table 134 is loaded with physical addresses under software control (device driver, operating system, etc.). The GRAM translator 132 receives virtual graphics memory addresses over the PCI Express link 125. The GRAM translator 132 uses the virtual addresses to access the GMP table 134. The GRAM translator 132 generates physical addresses which are delivered to the root device 140 via the PCI Express link 135.

The GMP table 134 is an address translation table. As previously mentioned, the GMP table 134 holds the addresses of the physical memory allocated by the operating system. The size of the table 134 may depend on the size of the GRAM. For example, if the GRAM is 2 GB, using 32-bit addresses for the pages and 4 kbytes per page, the GMP Table 134 will be (2*1024*1024*1024)/(4*1024) entries*4 bytes per entry=2 Mbytes. Although the GMP Table 134 is shown in this example embodiment as being integrated into the GM switch 130, other embodiments are possible where the GMP Table is located in memory separate from but local to the GM switch 130 or in system memory 150.

Figure 3:
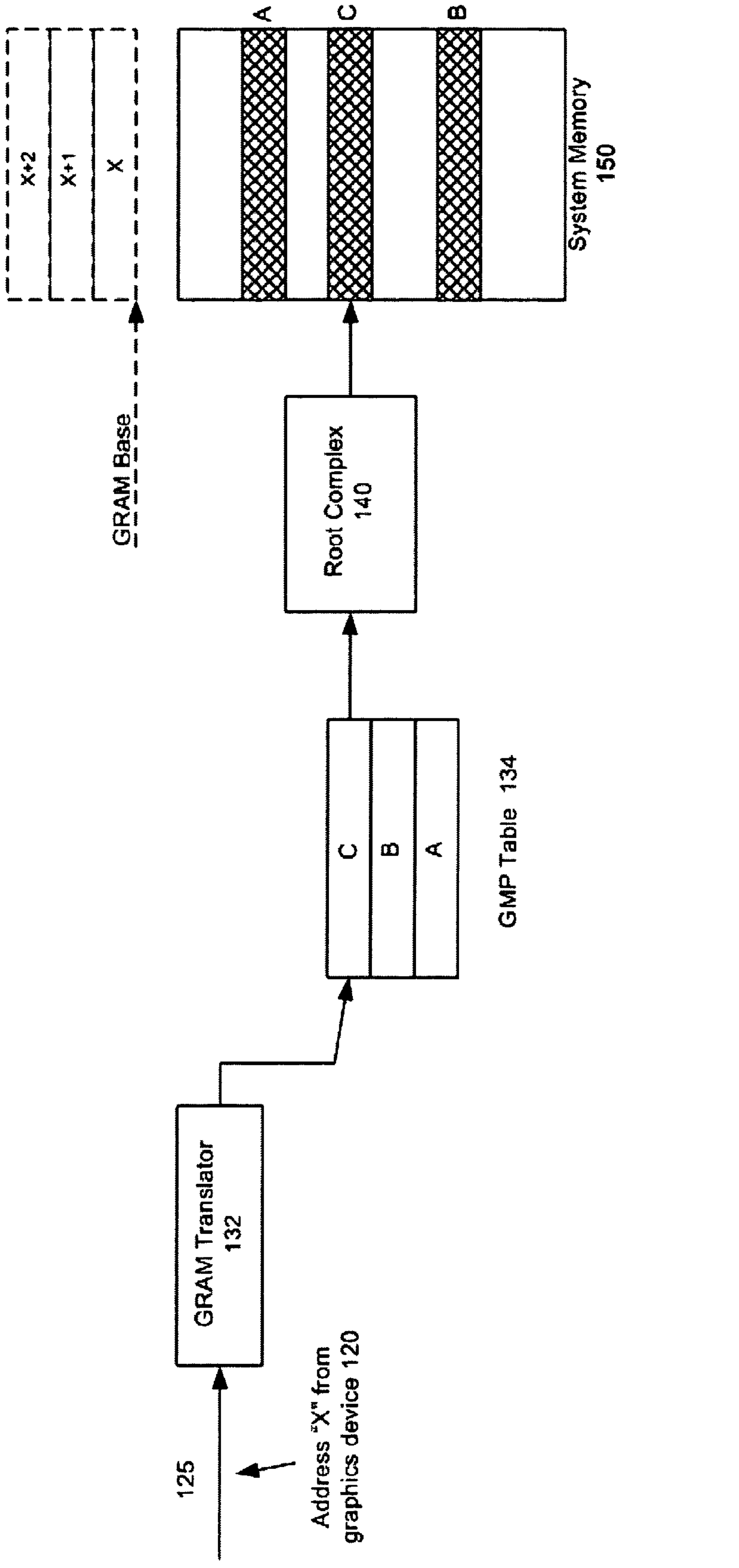
FIG. 3 is a block diagram demonstrating a conversion from a virtual graphics memory address to a physical system memory address.

FIG. 3 is a block diagram demonstrating a conversion from a virtual graphics memory address to a physical system memory address. The input to the GRAM translator 132 arrives over the PCI Express link 125. The input is a GRAM address "X" that the graphics device 120 needs to access. The GRAM space exists outside the system memory range. The GRAM space begins at an address denoted as GRAM Base. Several address locations in GRAM space are shown; addresses X, X+1, and X+2. The translator 132 takes the virtual graphics address X and converts it into an index to the GMP Table 134. The address at the specified GMP Table entry gives the actual physical address of the page of memory that the operating system has allocated. For this example, only three entries of the GMP Table 134 are shown; entries A, B, and C. The addresses stored in the A, B, and C entries correspond to regions A, B, and C of the system memory 150. For this example, the virtual address "X" provides an index to the C entry of the GMP Table 134. The GMP Table 134 delivers the physical address from the C entry to the root complex 140, which allows access to region C of the system memory.

Figure 4:
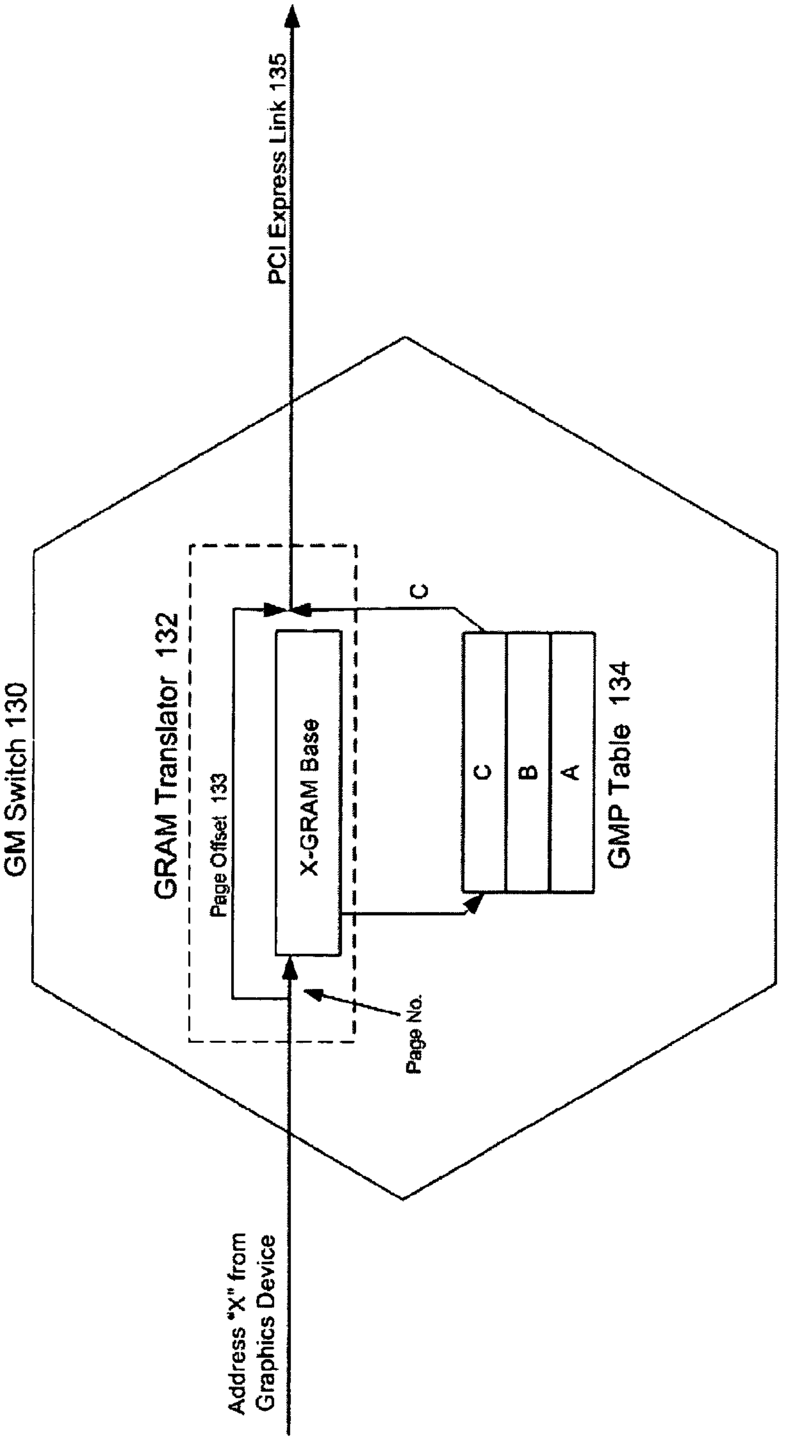
FIG. 4 is a block diagram of a graphics memory switch including a closer look at a graphics random access memory translator.

FIG. 4 is a block diagram of the GM switch 130 including a closer look at the GRAM Translator 132. As described above, a virtual graphics address "X" arrives from the graphics device. The GRAM translator 132 receives the address and uses the portion of the virtual address that denotes a page number to form an index into the GMP Table 134. The GRAM Translator 132 generates the index by subtracting the GRAM Base address from the address "X". The physical address stored at the entry C of the GMP table 134 is combined with the portion of the virtual address that indicates an offset into the page. The resulting address is delivered to the root complex 140 via the PCI Express link 135.

The overall functioning environment of the GRAM Translator may be such that the same operating system drivers that are used for AGP implementations can be used for managing the GMP Table and for allocating and releasing GRAM pages. In AGP, this driver is often referred to as the GART (graphics address remapping table) driver. Being able to reuse the existing GART drivers may ease the transition from AGP to PCI Express.

A video device driver may request N number of GRAM pages to the operating system. The GMP Table driver may allocate these pages in the memory and populate the GMP Table 134. The video driver will reserve the pages it needs to use for a particular application. The graphics device's view of the GRAM will be starting from the GRAM Base address and extending as far as is required. When the graphics device 120 needs to use the GRAM, it will issue a transaction for an address with the GRAM range. The GRAM translator 132, after checking to be sure that the request is within an appropriate range, will calculate an index into the GMP Table 134 and picks up an address of the actual page in the system memory 150. This address is sent over the PCI Express link 135 to the root complex 140 so that the system memory 150 can be accessed.

Figure 5:
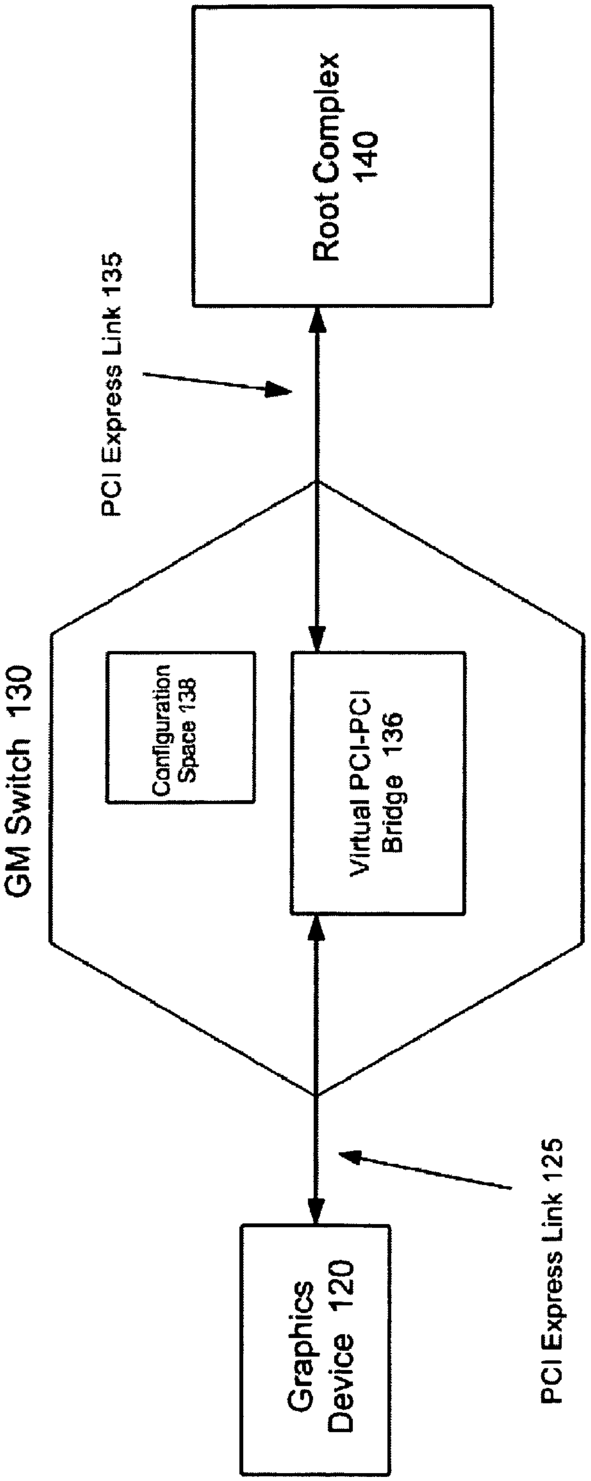
FIG. 5 is a block diagram of a graphics memory switch that includes a virtual PCI-PCI bridge.

FIG. 5 is a block diagram of a graphics memory switch that includes a virtual PCI-PCI bridge 136. When the PCI-PCI bridge 136 is encountered by an operating system during enumeration, an appropriate driver (perhaps a GART driver) is loaded. The GM switch 130 also includes a configuration space 138 which includes registers which are used for setting up the GMP Table for proper operation during runtime. The registers in the configuration space 138 may comply with the AGP specification so that no change in existing software is necessary.

Figure 6:
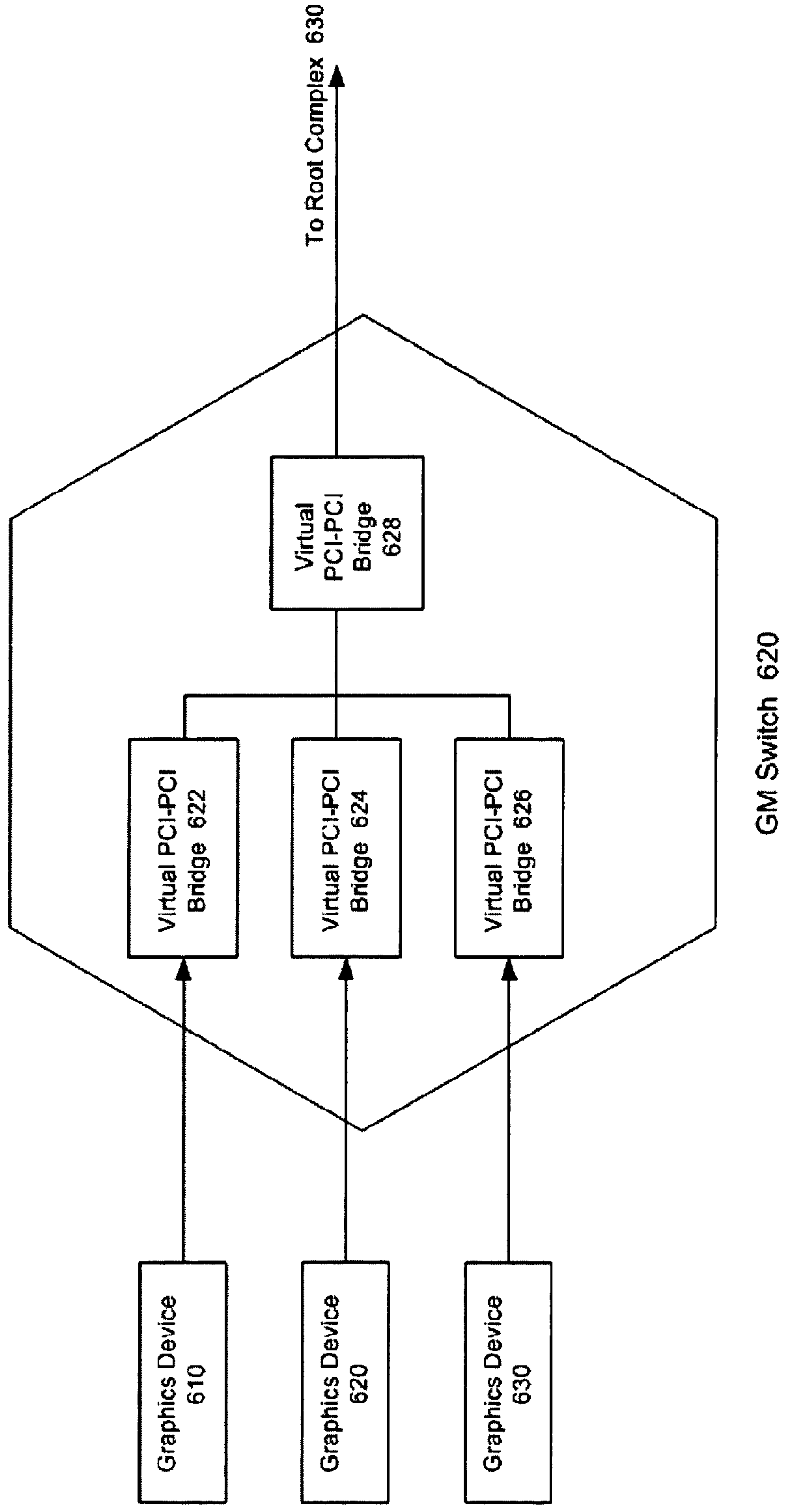
FIG. 6 is a block diagram of several graphics components coupled to a root complex through a graphics memory switch.

FIG. 6 is a block diagram of one example embodiment of several graphics components 610, 620, and 630 coupled to a root complex 630 through a graphics memory switch 620. A configuration of this type can provide a system that allows multiple graphics devices. Each of the graphics devices may or may not support multiple displays. A single driver can be loaded when the operating system encounters the virtual PCI-PCI bridge 628 that connects to the root complex 630. The multiple graphics devices 610, 620, and 630 can each have the same contiguous view of GRAM space and can share the information stored in GRAM space.

The graphics drivers 610, 620, and 630 are coupled to the virtual PCI-PCI bridge 628 via virtual PCI-PCI bridges 622, 624, and 626, respectively.

Figure 7:
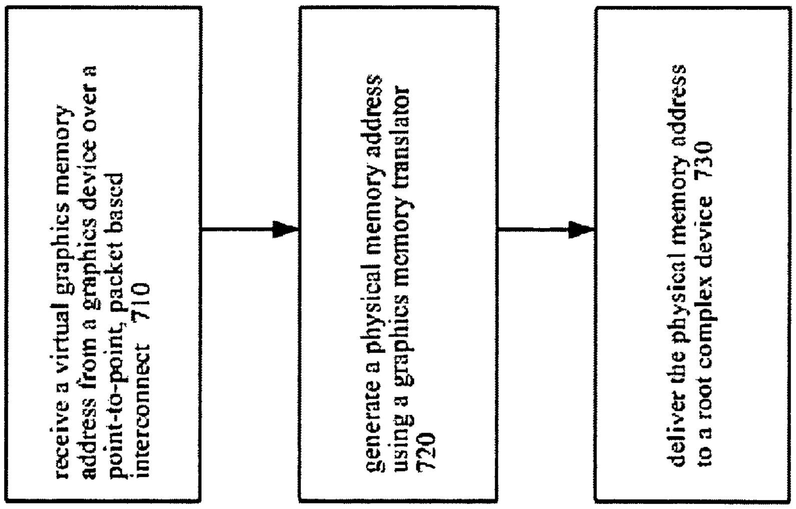
FIG. 7 is a flow diagram of one embodiment of a method for generating a physical memory address from a virtual graphics memory address received over a point-to-point, packet based interconnect.

FIG. 7 is a flow diagram of one embodiment of a method for generating a physical memory address from a virtual graphics memory address received over a point-to-point, packet based interconnect. At block 710, a virtual graphics memory address is received from a graphics device over a point-to-point, packet based interconnect. A physical memory address is generated using a graphics memory translator at block 720. Then, at block 730, the physical memory address is delivered to a root complex device.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

From the foregoing detailed description, it will be evident that there are a number of changes, adaptations and modifications of the present invention which come within the province of those skilled in the art. The scope of the invention includes any combination of the elements from the different species or embodiments disclosed herein, as well as subassemblies, assemblies, and methods thereof. However, it is intended that all such variations not departing from the spirit of the invention be considered as within the scope thereof.

What is claimed is:

1. A system, comprising:

a first graphics device connected to a first point-to-point, packet-based interconnect;

a graphics memory switch device coupled between the first graphics device and a root complex device, the graphics memory switch device including a first input to receive a first plurality of only contiguous virtual graphics memory addresses from the first graphics device over the first point-to-point, packet-based interconnect, and a graphics memory translator coupled to the first input to translate the first plurality of only contiguous virtual graphics memory addresses to a first plurality of non-contiguous physical memory addresses for use on a second point-to-point, packet-based interconnect;

the graphics memory switch coupled between a second graphics device and the root complex device, the graphics memory switch includes a second input to receive a second plurality of only contiguous virtual graphics memory addresses from the second graphics device connected to a third point-to-point, packet-based interconnect;

the graphics address translator coupled to the second input to translate the second plurality of only contiguous virtual graphics memory addresses to a second plurality of non-contiguous physical memory addresses for use on the second point-to-point, packet based interconnect to the root complex device, the graphics address translator including a single graphics memory page table; and the root complex device to receive the first and second plurality of non-contiguous physical memory addresses from the graphics memory switch device over the second point-to-point, packet based interconnect.

2. The system of claim 1, wherein the first, second, and third point-to-point, packet based interconnects adhere to a PCI Express specification.

3. The system of claim 1 further comprising the single graphics address remapping table driver to allocate the second plurality of only contiguous virtual graphics memory addresses contiguous with the first plurality of only contiguous virtual graphics memory addresses when the first, second, and third point-to-point, packet based interconnects are encountered by an operating system during enumeration.

4. The system of claim 3, wherein the single graphics memory page driver comprises the graphics address translator and a graphics address remapping table driver to set up the single graphics memory page table.

5. The system of claim 1, wherein the first graphics device comprises a first graphics card; the second graphics device comprises a second graphics card; and the root complex comprises a processor coupled to physical memory having the first and second plurality of non contiguous physical memory addresses.

6. A system, comprising:

a first graphics device connected to a first point-to-point, packet-based interconnect;

a graphics memory switch device coupled between the first graphics device and a root complex device, the graphics memory switch includes a first input to receive a first plurality of only contiguous virtual graphics memory addresses from the first graphics device over the first point-to-point, packet-based interconnect, and a graphics memory translator to translate the first plurality of only contiguous virtual graphics memory addresses and to generate a first plurality of non-contiguous physical memory addresses for use on a second point-to-point, packet-based interconnect;

the graphics memory switch coupled between a second graphics device and the root complex device, the graphics memory switch includes a second input to receive a second plurality of only contiguous virtual graphics memory addresses from the second graphics device connected to a third point-to-point, packet-based interconnect;

the graphics address translator coupled to the second input to translate the second plurality of only contiguous virtual graphics memory addresses to a second plurality of non-contiguous physical memory addresses for use on the second point-to-point, packet based interconnect to the root complex device, the graphics address translator including a single graphics memory page table; and the root complex device to receive the first and second plurality of non-contiguous physical memory addresses from the graphics memory switch device over the second point-to-point, packet based interconnect.

7. The system of claim 6, wherein the first, second, and third point-to-point, packet based interconnects adhere to a PCI Express specification.

8. The system of claim 6 further comprising the single graphics address remapping table driver to allocate the second plurality of only contiguous virtual graphics memory addresses contiguous with the first plurality of only contiguous virtual graphics memory addresses when the first, second, and third point-to-point, packet based interconnects are encountered by an operating system during enumeration.

9. The system of claim 8, wherein the single graphics memory page driver comprises the graphics address translator and a graphics address remapping table driver to set up the single graphics memory page table.

10. The system of claim 6, wherein the first graphics device comprises a first graphics card; the second graphics device comprises a second graphics card; and the root complex comprises a processor coupled to physical memory having the first and second plurality of non contiguous physical memory addresses.

11. A system, comprising:

a first graphics device connected to a first point-to-point, packet-based interconnect;

a memory controller hub coupled to the graphics device, the memory controller hub including a graphics memory switch device coupled between the first graphics device and a root complex device, the graphics memory switch device including a first input to receive a first plurality of only contiguous virtual graphics memory addresses from the first graphics device over the first point-to-point, packet-based interconnect, and a graphics memory translator to translate the first plurality of only contiguous virtual graphics memory addresses to a first plurality of non-contiguous physical memory addresses for use on a second point-to-point, packet-based interconnect, the graphics memory switch coupled between a second graphics device and the root complex device, the graphics memory switch includes a second input to receive a second plurality of only contiguous virtual graphics memory addresses from the second graphics device connected to a third point-to-point, packet-based interconnect;

the graphics address translator coupled to the second input to translate the second plurality of only contiguous virtual graphics memory addresses to a second plurality of non-contiguous physical memory addresses for use on the second point-to-point, packet based interconnect to the root complex device, the graphics address translator including a single graphics memory page table, a memory controller, and the root complex device to receive the first and second plurality of non-contiguous physical memory addresses from the graphics memory switch device and to deliver the first and second plurality of non-contiguous physical memory addresses to the memory controller.

12. The system of claim 11, wherein the first, second, and third point-to-point, packet based interconnects adhere to a PCI Express specification.

13. The system of claim 11 further comprising the single graphics address remapping table driver to allocate the second plurality of only contiguous virtual graphics memory addresses contiguous with the first plurality of only contiguous virtual graphics memory addresses when the first, second, and third point-to-point, packet based interconnects are encountered by an operating system during enumeration.

14. The system of claim 13, wherein the single graphics memory page driver comprises the graphics address translator and a graphics address remapping table driver to set up the single graphics memory page table.

15. The system of claim 11, wherein the first graphics device comprises a first graphics card; the second graphics device comprises a second graphics card; and the root complex comprises a processor coupled to physical memory having the first and second plurality of non contiguous physical memory addresses.

16. A method, comprising:

receiving a first plurality of only contiguous virtual graphics memory addresses from a first graphics device connected to a first point-to-point, packet based interconnect;

translating the first plurality of only contiguous virtual graphics memory addresses to a first plurality of non-contiguous physical memory addresses using a graphics memory translator for use on a second point-to-point, packet-based interconnect, the translator coupled between the first graphics device and a root complex device wherein translating further comprises using a single graphics memory page table;

receiving a second plurality of only contiguous virtual graphics memory addresses that are contiguous with the first plurality of contiguous virtual graphics memory addresses from a second graphics device connected to a third point-to-point, packet based interconnect;

translating the second plurality of only contiguous virtual graphics memory addresses to a second plurality of non-contiguous physical memory addresses using the graphics memory translator for use on the second point-to-point, packet based interconnect, the translator coupled between the second graphics device and the root complex device; and delivering the first and second plurality of non-contiguous physical memory addresses to the root complex device.

17. The method of claim 16, wherein receiving the first and second plurality of only contiguous virtual graphics memory addresses from the first and second graphics devices over the first and second point-to-point, packet based interconnects includes receiving a first and second plurality of only contiguous virtual graphics memory addresses from the first and second graphics devices over the first and second point-to-point, packet based interconnects that adheres to a PCI Express specification.

18. The method of claim 16, and further comprising setting up the table using a graphics address remapping table driver when the first, second, and third point-to-point, packet based interconnects are encountered by an operating system during enumeration.

19. The method of claim 16, wherein translating the first plurality of only contiguous virtual graphics memory addresses and translating the second plurality of only contiguous virtual graphics memory addresses comprises using a single graphics memory page table set up by a single graphics address remapping table driver to allocate the second plurality of only contiguous virtual graphics memory addresses contiguous with the first plurality of only contiguous virtual graphics memory addresses when the first, second, and third point-to-point, packet based interconnects are encountered by an operating system during enumeration.

20. The method of claim 16, wherein the first graphics device comprises a first graphics card; the second graphics device comprises a second graphics card; and the root complex comprises a processor coupled to physical memory having the first and second plurality of non contiguous physical memory addresses.

* * * * *